(12) United States Patent
Wisman et al.

(10) Patent No.: US 9,436,701 B2
(45) Date of Patent: Sep. 6, 2016

(54) METHODS AND SYSTEMS FOR REGULATING USER ENGAGEMENT

(71) Applicant: salesforce.com, inc., San Francisco, CA (US)

(72) Inventors: Nathan Wisman, San Francisco, CA (US); Nicholas Hellbusch, Westminster, CA (US)

(73) Assignee: salesforce.com, inc., San Francisco, CA (US)

( * ) Notice: Subject to any disclaimer, the term of this patent is extended or adjusted under 35 U.S.C. 154(b) by 561 days.

(21) Appl. No.: 13/913,213

(22) Filed: Jun. 7, 2013

(65) Prior Publication Data

US 2014/0012826 A1    Jan. 9, 2014

Related U.S. Application Data

(60) Provisional application No. 61/667,855, filed on Jul. 3, 2012.

(51) Int. Cl.
| | |
|---|---|
| *G06F 17/00* | (2006.01) |
| *G06F 17/30* | (2006.01) |
| *G06F 21/55* | (2013.01) |
| *G06F 21/62* | (2013.01) |

(52) U.S. Cl.
CPC ......... *G06F 17/3023* (2013.01); *G06F 21/554* (2013.01); *G06F 21/6227* (2013.01)

(58) Field of Classification Search
CPC ............. G06F 21/554; G06F 21/6227; G06F 17/3023
USPC .................................. 707/695, 783
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

*Primary Examiner* — Phong Nguyen
(74) *Attorney, Agent, or Firm* — Lorenz & Kopf LLP

(57) ABSTRACT

Methods and systems are provided for regulating interaction with respect to an object in a database. One exemplary method involves creating an engagement record associated with the object in the database and in response receiving a request for a database activity with respect to the object from a user, determining whether the user is authorized to initiate the database activity with respect to the object based on a protection status indicated by the engagement record for the object. When the first user is authorized, the database is updated to reflect the requested database activity associated with the object and the protection status of the engagement record is updated in response to the database activity. After updating the protection status of the engagement record, subsequent database activity with respect to the object initiated by a second user is regulated based on the updated protection status.

20 Claims, 7 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,177,839 B1 * | 2/2007 | Claxton ............... G06Q 20/12 705/44 |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,365,293 B2 * | 1/2013 | Brown ............... H04L 63/0428 705/51 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0133424 A1 * | 6/2008 | Myers ............... G06Q 50/188 705/80 |
| 2011/0137940 A1 * | 6/2011 | Gradin ............... G06F 17/30867 707/769 |
| 2012/0079004 A1 * | 3/2012 | Herman ............... G06F 17/30516 709/203 |
| 2012/0290104 A1 * | 11/2012 | Holt ............... G06Q 10/00 700/29 |

\* cited by examiner

FIG. 3

Table 300 (302):

| TENANT | OBJECT TYPE | USER TYPE | # OF USERS | DURATION | USER TYPE | # OF USERS | DURATION | USER TYPE | # OF USERS | DURATION |
|---|---|---|---|---|---|---|---|---|---|---|
| ORGID_1 | Account | AE | 1 | 180 | EBR | 1 | 90 | SR | 1 | 45 |

FIG. 7

Table 700 (702):

| TENANT | OBJECT TYPE | OBJECT | USER TYPE | USER | LAST ACTION | DAYS SINCE | EXP. DATE | AE PROT. | USER TYPE | USER | LAST ACTION | DAYS SINCE | EXP. DATE | SR PROT. | EBR PROT. | USER TYPE | USER | LAST ACTION | DAYS SINCE | EXP. DATE | EBR PROT. |
|---|---|---|---|---|---|---|---|---|---|---|---|---|---|---|---|---|---|---|---|---|---|
| ORGID_1 | Account | Acme Inc. | AE | John Doe | 4/3/2013 | 22 | 9/30/2013 | Y | SR | Jack Doe | 11/4/2012 | 172 | 12/19/2012 | N | N | EBR | Jane Doe | 3/13/2013 | 43 | 6/11/2013 | Y |

Rules of Engagement
ROE - 1118380

Edit Layout | Printable View | Help for this Page

Rules of Engagement Detail

| | |
|---|---|
| Rules of Engagement Name | ROE - 1118380 |
| Account | Acme Inc. |
| Account Region | AMER |
| Open Opportunity | |
| Opportunity Dead Date | |

▼ AE Touch Protection

| | |
|---|---|
| AE | JOHN DOE |
| AE Last Touch | 04/03/2013 |
| Days Since AE Last Touch | 22 |
| AE Touch Protected? | YES |

▼ SR Touch Protection

| | |
|---|---|
| SR | JACK DOE |
| SR Last Touch | 11/04/2012 |
| Days Since SR Last Touch | 172 |
| SR Touch Protected from SRs? | NO |
| SR Touch Protected from EBRs? | NO |

▼ EBR Touch Protection

| | |
|---|---|
| EBR | JANE DOE |
| EBR Last Touch | 03/13/2013 |
| Days Since EBR Last Touch | 43 |
| EBR Touch Protected? | YES |

FIG. 6

METHODS AND SYSTEMS FOR REGULATING USER ENGAGEMENT

CROSS-REFERENCE TO RELATED APPLICATION(S)

This application claims the benefit of U.S. provisional patent application Ser. No. 61/667,855, filed Jul. 3, 2012, the entire content of which is incorporated by reference herein.

TECHNICAL FIELD

Embodiments of the subject matter described herein relate generally to computer systems, and more particularly, to methods and systems for regulating user engagement and corresponding database activities in an on-demand computing system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like). Although collaboration among members of the sales staff with respect to a particular customer may be beneficial, if too many members of that organization's sales staff are concurrently interacting with that customer, there is a risk of frustrating, overwhelming, or otherwise interfering with the customer in a manner that could potentially degrade the relationship. For example, a customer may prefer to have only a single point of contact at the organization rather than dealing with multiple points of contact. Additionally, it may be inefficient for an organization's sales staff to dedicate too many resources to an individual customer, and potentially to the detriment of other customer relationships.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 depicts an exemplary configuration record in a configuration table suitable for implementation by a database in the on-demand application system of FIG. 1 in conjunction with the engagement management process of FIG. 2;

FIGS. 5-6 depict exemplary graphical user interface (GUI) displays that may be presented on a client device in the on-demand application system of FIG. 1 in accordance with one or more embodiments;

FIG. 7 depicts an exemplary engagement record corresponding to the GUI displays of FIGS. 5-6 that may be maintained in an engagement table suitable for implementation by a database in the on-demand application system of FIG. 1 in conjunction with the engagement management process of FIG. 2 in accordance with one or more embodiments.

DETAILED DESCRIPTION

Figure 1:
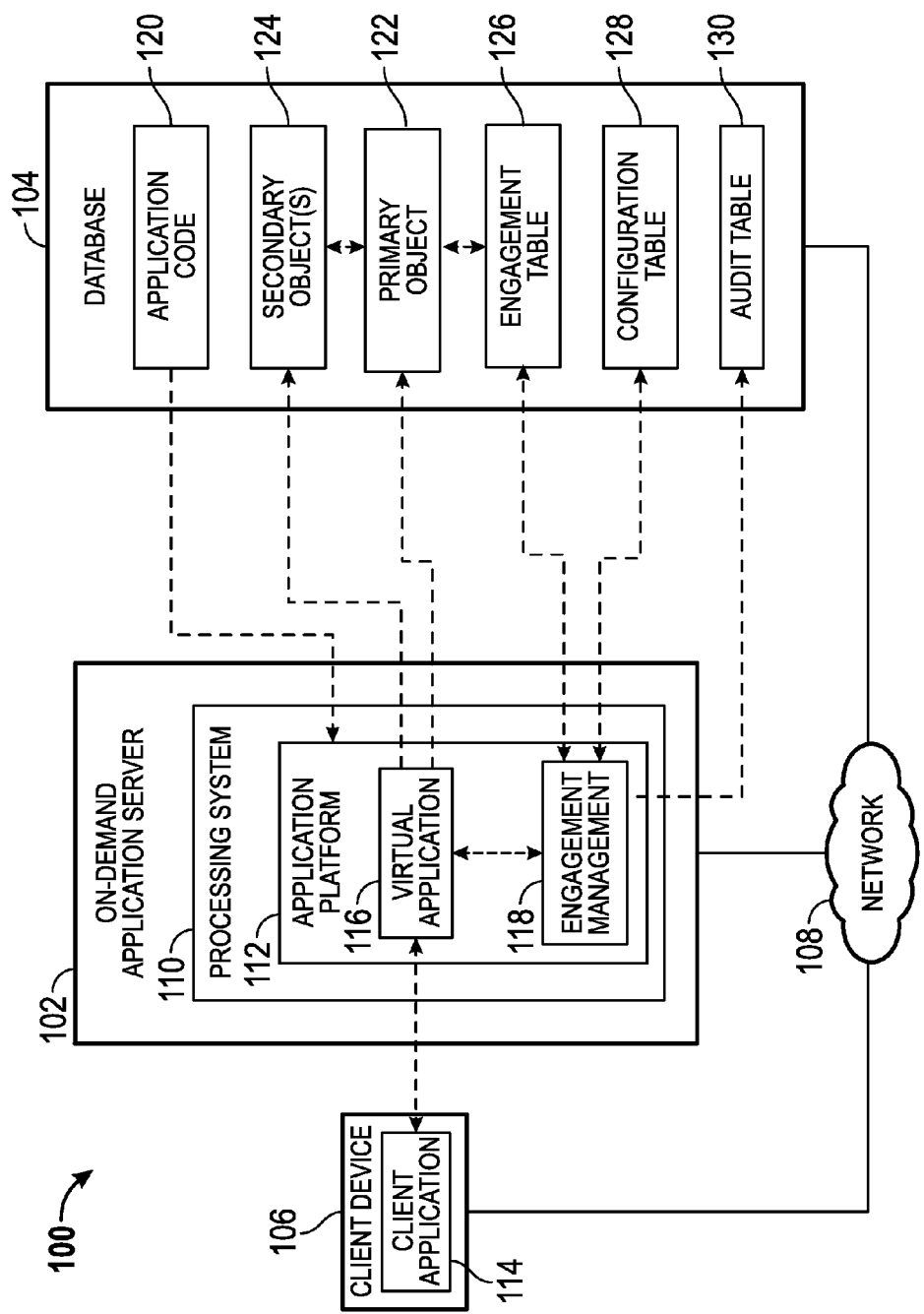
FIG. 1 is a block diagram of an exemplary on-demand application system.

Embodiments of the subject matter described herein generally relate to regulating user engagement in an on-demand computing system by protecting one or more users with respect to a particular database object and thereafter regulating user-initiated database activities with respect to that database object based on its protection status. In this regard, a protected user with respect to a particular database object has an authorization or ability to initiate or otherwise perform one or more types of database activities with respect to that database object to the exclusion of one or more other users. Thus, unprotected users may be prevented from initiating or otherwise performing certain types of database activities with respect to that database object by virtue of another user being protected, and that protected user need not be interacting with that database object concurrently to prevent requests from unprotected users from being denied or otherwise disallowed. For example, in an on-demand customer relationship management (CRM) application system, a protected user may be allowed to initiate or otherwise perform a database activity that results in or otherwise corresponds to a communication or another interaction with a particular customer (e.g., send an e-mail or another message, schedule a meeting, or the like), while one or more unprotected users are prevented from such interactions by virtue of the protected user's protected status. It should be noted that, in one or more embodiments, unprotected users may still be allowed to view and/or modify information in the database pertaining to a database object associated with that particular customer while one or more other users are protected with respect to that database object and/or customer. In this regard, the customer's points of contact may be limited to relatively few protected users, thereby reducing the likelihood of the customer being oversaturated by multiple users. Although the subject matter may be described herein in the context of a CRM application and CRM-related database objects, the CRM implementation is primarily used for clarity and ease of explanation and is not intended to be limiting. In this regard, it will be appreciated that the subject matter described herein is not limited to any particular type of application.

As described in greater detail below, the rules of engagement may be defined for a particular type of database object and stored in a configuration record in a database which is then referenced when instances of that type of database object are created or when the protection statuses for instances of that type of database object are updated. For example, in a CRM application, an administrative level user of a particular organization's sales staff may define rules of engagement for an 'account' database object that include criteria, parameters and/or values that dictate how different classes of users may be protected and/or restricted from interacting with the account and the duration for which users belonging to those different classes may be protected, with the corresponding criteria or parameters being stored in the configuration record. Upon creation of a new account database object by a user belonging to a particular class of users (e.g., an account executive), an engagement record associated with the new account database object is created in the database, with the engagement record maintaining criteria, parameters and/or values that indicate the protection status of the new account. In this regard, when the engagement record is created, the configuration record associated with accounts belonging to that organization may be referenced to determine an initial protection status for the creating account executive based on the rules of engagement. Thereafter, when other members of the organization's sales staff attempt to initiate or otherwise perform a database activity that would result in communications or other interactions with customer contacts at that account (e.g., send an e-mail or another message, schedule a meeting, or the like), the requested database activities may be prevented based on the protection status for the account. For example, other account executives may be prevented from interacting with that account while the creating account executive is protected.

In exemplary embodiments, the protection status is updated each time a protected user interacts with the database object, thereby extending the duration for which he or she will be maintained in the protected state according to the rules of engagement for that database object. Additionally, the protection status is periodically and automatically updated in the absence of interaction by protected users, thereby allowing the protection status of the database object to change and become unprotected in accordance with the rules of engagement, which, in turn, allows other users to interact with the database object and become protected. In some embodiments, notifications are automatically generated when the protection status changes, such that previously unprotected users may be apprised of the change in their ability to interact with the database object. Accordingly, users may be motivated to maintain a certain level of engagement or interaction with respect to a particular database object to avoid losing protection. Additionally, graphical user interface (GUI) displays may be provided that graphically present the current protection status for a particular database object, thereby allowing users to identify which users are protected, when those users' protection is likely to expire, and the like. User interactions with database objects may be logged or otherwise tracked, thereby allowing an administrative level user to analyze the relative levels of engagement with respect to database objects, assess the efficacy of the current rules of the engagement with respect to a particular type of database object, and adjust the rules of engagement to encourage or otherwise achieve a desired level of engagement with respect to that particular type of database object. In one or more exemplary embodiments, the subject matter described herein is implemented in a multi-tenant system, such that the rules of engagement may be tenant-specific and implemented on a per-tenant basis (e.g., by using a tenant identifier to associate the configuration records and engagement records with a particular tenant).

Turning now to FIG. 1, an exemplary on-demand application system 100 includes an application server 102 that includes or otherwise implements an application platform 112 capable of generating one or more instances of a virtual application 116 at run-time (e.g., or "on-demand") based upon data stored or otherwise maintained by a database 104 that is communicatively coupled to the application server 102 via a communications network 108, such as a wired and/or wireless computer network, a cellular network, a mobile broadband network, a radio network, or the like. In this regard, the application server 102 and the database 104 cooperatively provide a cloud computing platform (or framework). In accordance with one or more embodiments, the database 104 is realized as a multi-tenant database that is shared between multiple tenants, that is, the database 104 may store or otherwise maintain data associated with a number of different tenants and restrict accessibility of one tenant's data with respect to other tenants' data, as described in greater detail below in the context of FIG. 8.

In the illustrated embodiment of FIG. 1, the application server 102 generally represents a computing system or another combination of processing logic, circuitry, hardware, and/or other components configured to support the presentation processes and the related tasks, operations, and/or functions described herein. In this regard, the application server 102 includes a processing system 110, which may be implemented using any suitable processing system and/or devices, such as one or more processors, central processing units (CPUs), controllers, microprocessors, microcontrollers, processing cores and/or other computing resources configured to support the operation of the processing system 110 described herein. The processing system 110 may include or otherwise access a data storage element (or memory) (e.g., random access memory (RAM), read only memory (ROM), flash memory, magnetic or optical mass storage, or any other suitable non-transitory short or long term data storage or other computer-readable media) capable of storing programming instructions for execution by the processing system 110, that, when read and executed, cause processing system 110 to create, generate, or otherwise facilitate an application platform 112 that generates or otherwise provides the virtual application 116 at run-time (or "on-demand") based upon data stored or otherwise maintained by the database 104.

In exemplary embodiments, the virtual application 116 is provided to a client device 106 that is communicatively coupled to the application server 102 via the network 108. In this regard, the client device 106 generally represents an electronic device coupled to the network 108 that is utilized by a user to access the application platform 112 and/or virtual application 116 on the application server 102. In practice, the client device 106 can be realized as any sort of personal computer, mobile telephone, tablet or other network-enabled electronic device that includes a display device, such as a monitor, screen, or another conventional electronic display, capable of graphically presenting data and/or information provided by the application platform 112 and/or the virtual application 116 along with a user input device, such as a keyboard, a mouse, a touchscreen, or the like, capable of receiving input data and/or other information from the user of the client device 106.

A user may manipulate the client device 106 to execute a client application 114, such as a web browser application, and contact the application server 102 and/or application platform 112 using a networking protocol, such as the hypertext transport protocol (HTTP) or the like. The application platform 112 authenticates or otherwise identifies the user and generates the virtual application 116 at run-time based upon information and/or data associated with the user maintained by the database 104. In this regard, the virtual application 116 may include code, data and/or other dynamic web content provided to the client device 106 that is parsed, executed or otherwise presented by the client application 114 running on the client device 106. The virtual application 116 typically includes one or more GUI displays generated by the application server 102 based on data obtained from the database 104. In this regard, the GUI displays may pertain to the database objects associated with or otherwise belonging to a particular tenant (or organization) supported by the database 104, and the GUI displays may include GUI elements or widgets that allow the user of the client device 106 to select or otherwise identify the database object(s) of interest to the user (e.g., a particular account, opportunity, contact, or the like in the case of a CRM application) along with GUI elements or widgets that allow the user to initiate or otherwise perform various activities with respect to a selected database object.

In the illustrated embodiment of FIG. 1, the engagement management engine 118 generally represents a software module or another feature that is generated or otherwise implemented by the application platform 112 to monitor database activities that are initiated or otherwise performed by the virtual application 116 with respect to database objects on behalf of the user of the client device 106. The engagement management engine 118 confirms or otherwise verifies the user of the client device 106 is authorized to perform the requested database activity with respect to a particular database object 122 before allowing the virtual application 116 to initiate the requested database activity with respect to that database object 122. For purposes of explanation, and without limitation, the instance of the database object 122 being monitored is alternatively referred to herein as the primary database object. As described in greater detail below, for each instance of a primary database object 122, the engagement management engine 118 automatically creates an engagement record in an engagement table 126 in the database 104 that tracks and indicates which users are protected and authorized to initiate database activities with respect to the primary database object 122. The engagement management engine 118 utilizes the engagement record in the engagement table 126 to enforce rules of engagement defined for the object type of the primary database object 122 that are stored or otherwise maintained in a configuration table 128 in the database 104. Thus, the engagement management engine 118 may determine the protection status for the primary database object 122 based on the engagement record in the engagement table 126 and/or the rules of engagement defined in the configuration table 128 and regulate database activity requested or otherwise initiated by users with respect to that primary database object 122 based on the determined protection status.

Still referring to FIG. 1, in exemplary embodiments, the application server 102 and/or application platform 112 accesses the database 104 to obtain or otherwise retrieve application code 120, which includes computer-executable code segments, instructions, scripts or the like that are executed by the processing system 110 and/or application platform 112 to generate the virtual application 116. Thereafter, the virtual application 116 provides a GUI display that may be manipulated by the user of the client device 106 to request or otherwise initiate a database activity with respect to a primary database object 122. For example, in exemplary embodiments, the virtual application 116 tracks communications or other interactions (e.g., e-mails, messages, meeting requests, and the like) with respect to a primary database object 122 by creating corresponding database objects 124 associated with the primary database object 122 that are stored or otherwise maintained in the database 104. For purposes of explanation, and without limitation, an instance of a database object 124 associated with the primary database object 122 being monitored may alternatively be referred to herein as a secondary database object.

For example, in a CRM application, the primary database object 122 being monitored may be an account database object corresponding to a customer of a tenant supported by the database 104, wherein the virtual CRM application 116 provides an e-mail editor GUI display that allows a user of the client device 106 to e-mail a customer contact associated with that account object 122, with the virtual CRM application 116 creating a corresponding e-mail database object 124 associated with the account object 122 to facilitate tracking customer interaction associated with that account. Alternatively, the user of the client device 106 may utilize the GUI display to create one or more tasks, events, or other activities associated with the account, with the virtual CRM application 116 creating corresponding database objects 124 associated with the account object 122 to facilitate tracking tasks, events, and other activities associated with that account. In response to the user of the client device 106 manipulating the virtual application 116 to perform a particular activity with respect to the primary database object 122, the virtual application 116 generates a request to create the corresponding secondary database object 124 associated with the primary database object 122 and provides the request to the engagement management engine 118.

As described in greater detail below in the context of FIGS. 2-3, in response to receiving the request to create a secondary database object 124 associated with a primary database object 122, the engagement management engine 118 accesses the engagement record in the engagement table 126 that is associated with the primary database object 122 to determine the current protection status for the primary database object 122. When the current protection status indicates that the user is not authorized to initiate or otherwise perform activities with respect to the primary database object 122 (e.g., because the primary database object 122 is protected or otherwise locked for activities by another user), the engagement management engine 118 prevents the secondary database object 124 from being created (e.g., by discarding the request or otherwise failing to provide the request to the database 104) and notifies the virtual application 116 that the requested activity is not authorized for the user of the client device 106. Alternatively, when the current protection status indicates that the user is authorized to initiate or otherwise perform activities with respect to the primary database object 122 (e.g., because the primary database object 122 is protected or otherwise locked for activities by the user of the client device 106), the engagement management engine 118 continues servicing the request by creating the secondary database object 124 in the database 104 and updating the engagement record to reflect the activity by the user of the client device 106. To create the secondary database object 124, the engagement management engine 118 may provide the request to the database 104, or alternatively, the engagement management engine 118 may notify the virtual application 116 that the user of the client device 106 is authorized to perform the activity, wherein the virtual application 116 provides the request to the database 104 in response to receiving the notification (or confirmation) from the engagement management engine 118. Additionally, in some embodiments, the engagement management engine 118 may also create a record in an audit table 130 that indicates the activity by the user of the client device 106 associated with the primary database object 122 to facilitate tracking and analysis of authorized activity with respect to the primary database object 122, as described in greater detail below.

In exemplary embodiments, the engagement management engine 118 periodically accesses the database 104 to automatically update the protection status indicated by the engagement records in the engagement table 126 in accordance with the rules of engagement defined in the configuration table 128 and automatically generates notifications that may be provided to users in response to changes to the protection status of a primary database object 122. In this regard, the rules of engagement may define a duration of protection for a protected user belonging to a particular class of users before the primary database object 122 reverts to being unprotected with respect to other users belonging to that same class of users and/or a different class of users. For example, in a CRM application, the rules of engagement for an account database object 122 may indicate that a sales representative may be protected for 30 days after his or her most recent activity with respect to that account before the account becomes unprotected with respect to other sales representatives. Accordingly, when periodically updating the protection status for that account database object 122, the engagement management engine 118 automatically updates the protection status for the engagement record in the engagement table 126 associated with the account object 122 to indicate that the account object 122 is no longer protected with respect to sales representatives when the previously protected sales representative has not performed any activity with respect to that account within the last 30 days.

In some embodiments, in response to a change in the protection status (e.g., from a protected state to an unprotected state for a particular class of users), the engagement management engine 118 automatically generates a notification that may be provided to users in that particular class to notify them of the change in protection status. For example, the engagement management engine 118 may create a message indicating that a particular account is unprotected for sales representatives and store the message in the database 104 in association with a feed for the account object 122, so that a sales representatives subscribed to the feed of the account object 122 may receive the notification that account is no longer protected when he or she logs-in to the virtual application 116 or otherwise accesses the feed associated with that account object 122. Providing messages in a feed associated with a database object is described in U.S. patent application Ser. No. 12/945,410, now U.S. Patent Application Publication No. 2011/0113071. In some embodiments, the notification message may be automatically pushed to client devices associated with users that are subscribed to the feed of the primary database object 122.

Figure 2:
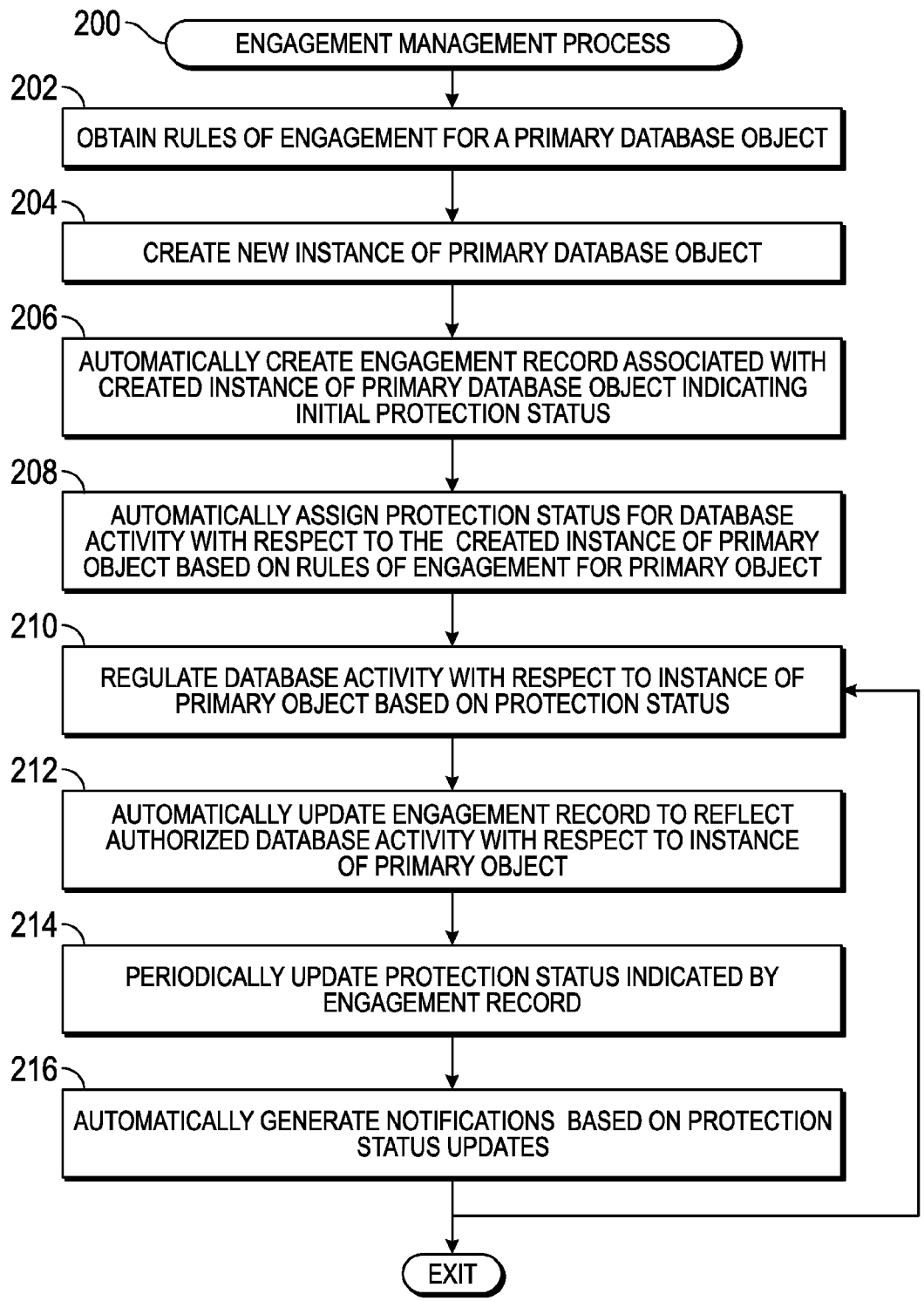
FIG. 2 is a flow diagram of an exemplary engagement management process suitable for implementation by the on-demand application system of FIG. 1 in accordance with one or more embodiments.

FIG. 2 depicts an exemplary embodiment of an engagement management process 200 suitable for implementation by an on-demand application system to regulate activity with respect to a database object. The various tasks performed in connection with the illustrated process 200 may be performed by software, hardware, firmware, or any combination thereof. For illustrative purposes, the following description may refer to elements mentioned above in connection with FIG. 1. In practice, portions of the engagement management process 200 may be performed by different elements of the on-demand application system 100, such as, for example, the application server 102, the database 104, the processing system 110, the application platform 112, the virtual application 116, the engagement management engine 118 and/or the application code 120. It should be appreciated that the engagement management process 200 may include any number of additional or alternative tasks, the tasks need not be performed in the illustrated order and/or the tasks may be performed concurrently, and/or the engagement management process 200 may be incorporated into a more comprehensive procedure or process having additional functionality not described in detail herein. Moreover, one or more of the tasks shown and described in the context of FIG. 2 could be omitted from a practical embodiment of the engagement management process 200 as long as the intended overall functionality remains intact.

In the illustrated embodiment of FIG. 2, the engagement management process 200 begins by obtaining rules of engagement for one or more different types of primary database objects to be managed by the engagement management process 200 (task 202). As described above, the rules of engagement for a particular type of primary database object include various parameters or criteria that may be utilized to determine which users in the on-demand application system 100 are protected or otherwise allowed to interact with instances of that primary database object and for how long those users' rights to interact with those primary database objects will be protected with respect to unprotected users. The rules of engagement may define which classes of users can interact with a primary database object concurrently, the number of different users within those respective classes that may be authorized to interact with the primary database object concurrently, and a duration for which a respective protected user will have the authorization to interact with the primary database object to the exclusion of other unprotected users of that class of users. In a multi-tenant system, the rules of engagement for a particular type of primary database object may be tenant-specific, thereby allowing the protection status with respect to instances of that primary database object to vary depending on the tenant associated with a respective instance of the primary database object.

In accordance with one or more embodiments, the engagement management engine 118 obtains the rules of engagement from an administrator-level user associated with a particular tenant via the client device 106 and stores the rules of engagement the configuration table 128 by creating a configuration record associated with a particular type of primary database object for that tenant. For example, for a CRM application, an administrator-level user of a particular company's sales staff may manipulate the virtual application 116 to access a GUI display for defining rules of engagement and provide rules of engagement for different classes of users (e.g., account executives, enterprise business representatives, sales representatives, and the like) that are to be enforced or otherwise applied with respect to that tenant's associated account objects, wherein the engagement management engine 118 creates a configuration record in the table 128 with fields identifying that the configuration record pertains to account database objects and that the configuration record is associated with that tenant identifier.

For example, FIG. 3 depicts an exemplary configuration record 302 in a configuration table 300 suitable for use as the configuration table 128 in connection with the engagement management process 200 of FIG. 2. The illustrated configuration table 300 includes columns (or fields) for identifying the tenant associated with each configuration record and the type of database object associated with each configuration record, along with columns (or fields) for defining the different classes (or types) of users that may be protected with respect to that type of database object, the number of users that may be protected for each different class of users, and the duration for which users of each different class may be protected. For example, configuration record 302 indicates it is associated with account database objects that are associated with the tenant of the database 104 having the tenant identifier 'ORGID_1', with one account executive (AE) associated with the 'ORGID_1' tenant capable of being protected at a time with respect to other account executives associated with the 'ORGID_1' tenant for a duration of 180 days, one enterprise business representative (EBR) associated with the 'ORGID_1' tenant capable of being protected at a time with respect to other enterprise business representatives associated with the 'ORGID_1' tenant for a duration of 90 days, and one sales representatives (SR) associated with the 'ORGID_1' tenant capable of being protected at a time with respect to other sales representatives associated with the 'ORGID_1' tenant for a duration of 45 days.

It should be understood that FIG. 3 is merely a simplified representation of a configuration record in a configuration table provided for purposes of explanation and is not intended to limit the subject matter described herein in any way. In practice, there are numerous possible combinations of rules of engagement that may be implemented with varying degrees of complexity. For example, the duration for which users may be protected may depend on other secondary database objects associated with the primary database objects (e.g., the lifetime of an opportunity or a case associated with a particular account) and/or users may protected across different classes of users (e.g., a sales representative may be protected with respect to other sales representatives and also with respect to enterprise business representatives). In this regard, additional columns (or fields) may be added to the configuration table and/or configuration record to support the desired rules of engagement.

Referring again to FIG. 2, and with continued reference to FIG. 1, after rules of engagement are obtained for a primary database object, the illustrated engagement management process 200 continues by creating a new instance of that primary database object in the database, and in response to creating the new primary database object, automatically creating an engagement record associated with the new primary database object, and automatically assigning initial protection status for the new primary database object based on the rules of engagement for that primary database object (e.g., tasks 204, 206, 208). In this regard, a user of a client device 106 may manipulate GUI elements of a GUI display of the virtual application 116 to indicate a desire to create a new instance of a primary database object and provide metadata and/or other information describing the primary database object to be created. Upon creation of the new primary database object 122, the virtual application 116 may determine whether that type of primary database object should have an associated engagement record. In response to determining that the new primary database object 122 should have an engagement record, the virtual application 116 provides a request or notification to the engagement management engine 118 that identifies the new primary database object 122 along with the user of the client device 106 that initiated creation of the new primary database object 122 and that user's associated tenant. In this manner, the engagement management engine 118 automatically creates an engagement record associated with the new primary database object 122 in the engagement table 126 in response to creation of the new primary database object 122. In exemplary embodiments, the engagement management engine 118 automatically assigns initial protection status to the new primary database object 122 by automatically populating one or more fields of the engagement record based at least in part on the rules of engagement maintained by the configuration record for that type of primary database object 122 associated with the creating user's tenant.

In accordance with one or more embodiments, the engagement management engine 118 automatically creates an engagement record in the table 126 with fields identifying that the engagement record is associated with the new primary database object 122 and that the user of the client device 106 that initiated creation of the new primary database object 122 is protected with respect to the new primary database object 122 for the duration indicated by the configuration record in the configuration table 128 associated with that database object type for the creating user's tenant. For example, referring again to FIG. 3, if the new primary database object 122 is an account object and the user of the client device 106 is an account executive associated with the 'ORGID_1' tenant, the engagement management engine 118 automatically identifies the configuration record 302 in the table 300 as having the rules of engagement pertaining to accounts associated with the 'ORGID_1' tenant and automatically updates fields of the engagement record in the table 126 to assign the user of the client device 106 as the protected account executive for a duration of 180 days. For remaining fields of the engagement record, the engagement management engine 118 may provide null values to indicate that the new primary database object 122 is unprotected with respect to other classes of users. In other embodiments, if the configuration record indicates that the creating user should be protected with respect to another class of users, the engagement management engine 118 may update a field of the engagement record to indicate the new primary database object 122 is protected with respect to that class of users. For example, if the configuration record indicates that account executives are protected with respect to enterprise business representatives, the engagement management engine 118 may initially assign a protected state for the new primary database object 122 with respect to enterprise business representatives even though fields of the configuration record identifying the protected enterprise business representative may have null values.

Referring again to FIG. 2, and with continued reference to FIG. 1, after creating a primary database object and automatically assigning initial protection status to that primary database object, the engagement management process 200 continues by regulating database activity with respect to that primary database object based on its protection status and automatically updating the protection status to reflect authorized database activities with respect to that primary database object (tasks 210, 212). As described in greater detail below in the context of FIG. 4, when database activity requests with respect to a primary database object are generated or otherwise created by users of client devices 106 in the on-demand application system 100, the engagement management engine 118 accesses the engagement record for the primary database object and allows or prevents the requested database activity based on the current protection status of the primary database object with respect to the requesting user's class of users. When the current protection status indicates that the requesting user is protected or otherwise allows the requested database activity by the requesting user (e.g., because the primary database object is unprotected with respect to the requesting user's class of users), the engagement management engine 118 allows the requested database activity and updates the engagement record for the primary database object to reflect the recent database activity with respect to the primary database object.

For example, if the requesting user is a protected user for that primary database object, the engagement management engine 118 automatically updates the date and/or time of the most recent database activity by that protected user that is maintained by the engagement record and/or automatically determines an updated protection expiration date and/or time based on the current date and/or time, thereby extending the duration for which that user will be protected with respect to that primary database object. Alternatively, if the requesting user is not protected with respect to the primary database object but also belongs to a class of users that is not prevented from interacting with the primary database object 122 based on its current protection status, the engagement management engine 118 updates the engagement record to indicate that requesting user is now protected with respect to the primary database object and the date and/or time of the database activity. Conversely, when the current protection status does not authorize the requested database activity by the requesting user (e.g., because another user is protected), the requested database activity is prevented from being initiated or otherwise performed.

Still referring to FIG. 2, in exemplary embodiments, the engagement management process 200 automatically updates the protection statuses for engagement records in the database on a periodic basis based on the respective rules of engagement for the respective primary database object associated with a respective engagement record (task 214). For example, in one embodiment, the engagement management engine 118 accesses the database 104 to update the protection statuses for the engagement records in the table 126 on a daily basis. The engagement management engine 118 periodically accesses the engagement table 126 in the absence of any database activity requests and automatically determines whether the protection status indicated by a respective engagement record should be changed based on the current date and/or time relative to the date and/or time of the most recent interaction with the associated primary database object by a protected user and the protection duration defined by the configuration record in the table 128 for that type of primary database object.

For example, referring again to FIG. 3, in accordance with one or more embodiments, during the automatic periodic update, when an engagement record in the engagement table 126 is associated with an account database object associated with the 'ORGID_1' tenant, the engagement management engine 118 identifies the configuration record 302 in the table 300 as having the rules of engagement pertaining to that engagement record. The engagement management engine 118 may access fields of that engagement record corresponding to the date and/or time of the most recent interaction by protected users, calculate or otherwise determine a number of days or another amount of time since the most recent activity by respective protected users based on the current date and/or time, and store that determined number of days since the most recent activity in the engagement record. Additionally, for each protected user, the engagement management engine 118 may calculate or otherwise determine a protection expiration date and/or time when that user will lose protection based on the protection duration defined in the configuration record 302 for that user's class and the current date and/or time. If the current date and/or time indicates the protection expiration date and/or time has passed, the engagement management engine 118 automatically updates or otherwise changes a field of the engagement record associated with that user to change their protection status from a protected state to an unprotected state. For example, referring again to FIG. 3, if 91 days have elapsed since a protected enterprise business representative last interacted with the account, the engagement management engine 118 may change fields of the engagement record for the enterprise business representative's status to indicate the unprotected state and that it has been 91 days since the previously protected enterprise business representative has interacted with the account.

It should be noted that in some embodiments, the engagement management engine 118 may calculate the protection expiration date and/or time when the engagement management engine 118 updates the date and/or time of the most recent interaction by a protected user in the engagement record (e.g., at the time of a requested database activity) and store the protection expiration date and/or time for that user in the engagement record. In this regard, when the engagement management engine 118 accesses the engagement table 126 to periodically update the protection status, the engagement management engine 118 may utilize the protection expiration date and/or time maintained by the respective engagement record to identify when to change the protection status without referencing the configuration table 128 and calculating the protection expiration date and/or time during each periodic update.

Referring again to FIG. 2, in exemplary embodiments, in response to changes to the protection status of a primary database object, the engagement management process 200 automatically generates a notification associated with that primary database object that indicates the protection status change to the previously protected user and/or other unprotected users (task 216). For example, as described above, when the protection status for a particular class of users changes with respect to a particular primary database object 122, the engagement management engine 118 may automatically generate a message or post in a feed associated with that primary database object 122 that is viewable to users belonging to that class. Accordingly, users that are subscribed to a feed associated with a primary database object 122 may be automatically notified of a change in the protection status of that primary database object 122, for example, by the application platform 112 and/or virtual application 116 automatically pushing the message or notification to a client device 106 associated with a subscribed user. In this regard, users interested in potentially interacting with that primary database object 122 may pursue such interactions with respect to that primary database object 122 and become protected with respect to that primary database object 122.

For example, referring again to FIG. 3, once 91 days have elapsed since a protected enterprise business representative last interacted with the account and the engagement management engine 118 automatically changes the field of the engagement record to indicate the unprotected state for enterprise business representatives. In response to the change, the engagement management engine 118 automatically generates a message indicating the account is unprotected with respect to enterprise business representatives (e.g., by identifying that the previously protected user is no longer protected) and stores or otherwise maintains the message in the database 104 in association with the account database object and/or the account database object's feed. In this regard, when an unprotected enterprise business representative on a client device 106 views or otherwise accesses the account and/or the account's associated feed via the virtual application 116, the message may be presented to the unprotected enterprise business representative.

Figure 4:
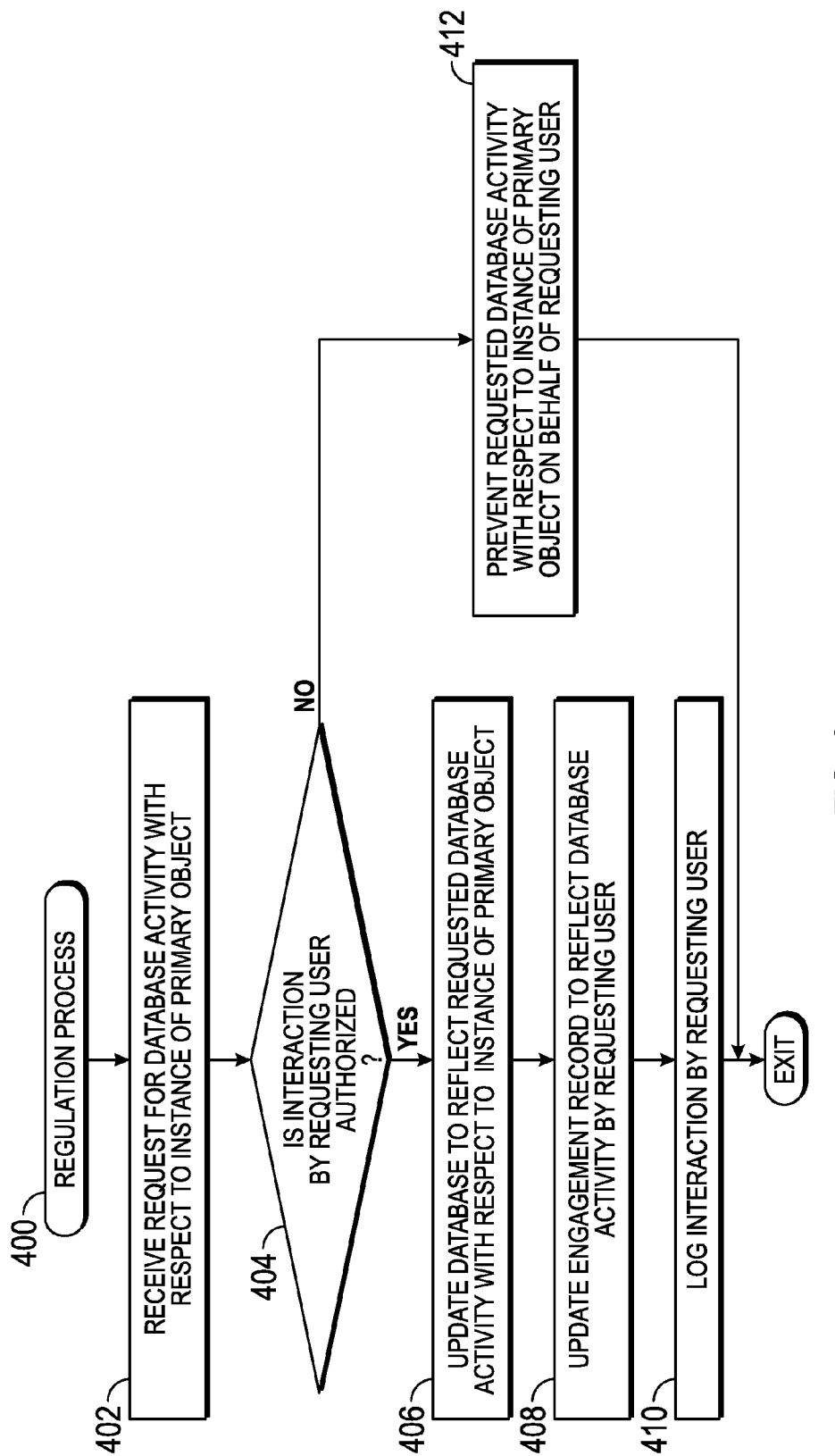
FIG. 4 is a flow diagram of an exemplary regulation process suitable for implementation by the on-demand application system of FIG. 1 in conjunction with the engagement management process of FIG. 2 in accordance with one or more embodiments.

Referring now FIG. 4, an exemplary regulation process 400 may be performed in conjunction with the engagement management process 200 of FIG. 2 (e.g., task 210) to regulate user interactions with respect to a database object based on its current protection status. The various tasks performed in connection with the illustrated process 400 may be performed by software, hardware, firmware, or any combination thereof. For illustrative purposes, the following description may refer to elements mentioned above in connection with FIG. 1. In practice, portions of the regulation process 400 may be performed by different elements of the on-demand application system 100, such as, for example, the application server 102, the database 104, the processing system 110, the application platform 112, the virtual application 116, the engagement management engine 118 and/or the application code 120. It should be appreciated that the regulation process 400 may include any number of additional or alternative tasks, the tasks need not be performed in the illustrated order and/or the tasks may be performed concurrently, and/or the regulation process 400 may be incorporated into a more comprehensive procedure or process having additional functionality not described in detail herein. Moreover, one or more of the tasks shown and described in the context of FIG. 4 could be omitted from a practical embodiment of the regulation process 400 as long as the intended overall functionality remains intact.

In exemplary embodiments, the regulation process 400 begins by receiving a request for a database activity with respect to a primary database object that is initiated by a particular user within the on-demand application system (task 402). For example, the user of the client device 106 may manipulate GUI elements provided within the virtual application 116 to interact with a primary database object 122. For example, the user of the client device 106 may manipulate GUI elements provided within the virtual application 116 to create an e-mail, a meeting request, an event, or the like to be associated with a particular account. As described above, in exemplary embodiments, such interactions the account database object 122 are logged or otherwise tracked by creating corresponding secondary database objects 124 associated with the account database object 122. In response to the user manipulating the GUI elements, the virtual application 116 may capture information identifying the user of the client device 106 (e.g., a unique user identifier), the user's associated tenant (e.g., a tenant identifier associated with the user), the primary database object 122 the user is attempting to interact with (e.g., a unique object name and/or identification number), and/or the type of interaction that the user is attempting to initiate and provide the captured identifying information to the engagement management engine 118 as a request for the particular type of interaction with respect to the identified primary database object 122.

In response to receiving the request, the regulation process 400 continues by determining whether the requesting user is authorized to interact with the identified primary database object (task 404). In this regard, using the tenant identifier associated with the user of the client device 106 and the object identifier associated with the primary database object 122, the engagement management engine 118 accesses the engagement table 126 to obtain the engagement record that corresponds to that particular primary database object 122. Thereafter, the engagement management engine 118 utilizes the user identifier associated with the user of the client device 106 to determine whether the obtained engagement record indicates the requesting user is protected with respect to the primary database object 122. In this regard, if the requesting user is protected with respect to the primary database object 122, the engagement management engine 118 verifies or otherwise confirms the user is authorized to interact with the identified primary database object. If the request user is not protected with respect to the identified primary database object, the engagement management engine 118 identifies or otherwise determines the class of users to which the requesting user belongs and then determines whether the obtained engagement record indicates the identified primary database object is unprotected with the requesting user's class of users. In this regard, if the primary database object is unprotected with the requesting user's class of users, the engagement management engine 118 also verifies or otherwise confirms the user is authorized to interact with the identified primary database object. Conversely, if the primary database object is protected with the requesting user's class of users, the engagement management engine 118 determines that the user is unauthorized to interact with the primary database object.

In response to determining the requesting user is authorized to interact with the identified primary database object, the regulation process 400 continues servicing the request to allow the requested database activity to be performed and updates or otherwise modifies the database to reflect the requested database activity (task 406). In this regard, the engagement management engine 118 provides notification or confirmation to the virtual application 116 that the user is authorized to initiate the request, wherein in response to the notification, the virtual application 116 provides the request to the database 104 or otherwise interacts with the database 104 to create or modify a secondary database object 124 associated with the identified primary database object 122. Alternatively, the engagement management engine 118 may provide the request to the database 104 or otherwise interact with the database 104 to create or modify a secondary database object 124 associated with the identified primary database object 122. For example, a new instance of an e-mail database object, a meeting database object, an event database object, or some other secondary database object 124 may be instantiated in the database 104 and associated with the identified primary database object 122. After the secondary database object 124 is created in the database 104, the virtual application 116 may present or otherwise provide GUI elements adapted to allow the user of the client device 106 to continue performing the desired interaction (e.g., writing the body of an e-mail, scheduling a meeting, defining an event, or the like) with respect to the identified primary database object 122.

Still referring to FIG. 4, the regulation process 400 automatically updates or otherwise modifies the engagement record associated with the identified primary database object to reflect the interaction by the requesting user (task 408). In this regard, when the engagement record already indicates the requesting user is protected with respect to the identified primary database object 122, the engagement management engine 118 updates any fields of the engagement record that identify the date and/or time of the protected user's most recent interaction, the number of days and/or amount of time since the user's most recent interaction, and/or the protection expiration date to reflect the current date and/or time when the database activity request was received from the virtual application 116. Alternatively, when the engagement record indicates that the identified primary database object 122 is unprotected with respect to the requesting user's class of users, the engagement management engine 118 updates a protected user field of the engagement record for that class of users to include the user identifier for the user of the client device 106, thereby identifying the user as a protected user for that class of users, along with updating a protection status field to indicate that the user is currently protected. Additionally, the engagement management engine 118 updates fields of the engagement record to identify the date and/or time of the newly protected user's interaction with the primary database object 122. The engagement management engine 118 may also access the configuration table 128 to obtain the configuration record for the primary database object 122 (e.g., using the requesting user's tenant identifier and the object type), identify the protection duration for the requesting user's class of users, calculate a protection expiration date for the user based on the current date and/or time when the database activity request was received from the virtual application 116, and update the corresponding field of the engagement record to identify the protection expiration for the newly protected user.

In accordance with one or more embodiments, the regulation process 400 also logs the interaction with the primary database object for subsequent analysis (task 410). For example, the engagement management engine 118 may create an interaction record in an audit table 130 that includes fields that identify the user performing the interaction, the user's tenant, the user's class of users, the primary database object being interacted with, the type of interaction that was performed, and/or the date and/or time of the interaction. Thereafter, an administrator associated with the user's tenant or some other higher level user in the on-demand application system 100 may manipulate the virtual application 116 to review and analyze different interactions by different users with respect to different primary database objects and thereby determine whether the rules of engagement for different types of primary database objects and/or different classes of users should be modified to achieve a desired level of engagement. For example, if an administrator belonging to a particular tenant reviews the interaction by that tenant's sales representatives with respect to that tenant's accounts and determines that 95% of the time protected sales representatives do not exceed 21 days between successive interactions with their protected account and the current protection duration for sales representatives is set to 45 days, the administrator may manipulate the virtual application 116 to modify the field of the configuration record for the tenant's accounts in the table 128 and reduce the protection duration for sales representatives from 45 days to 28 days to encourage more frequent interactions (or increased engagement) among those sales representatives that are exceeding 21 days between successive interactions.

Still referring to FIG. 4, in response to determining the requesting user is not authorized to interact with the identified primary database object, the regulation process 400 prevents the requested database activity from being performed with respect to the identified primary database object (task 412). For example, in some embodiments, the engagement management engine 118 may discard the request or otherwise fail to provide the request to the database 104 and/or provide notification to the virtual application 116 that the user of the client device 106 is unauthorized to interact with the primary database object 122. In response, the virtual application 116 may generate or otherwise provide a GUI display on the client device 106 that notifies the user that the requested interaction with the primary database object 122 is denied. For example, the engagement management engine 118 may obtain, from the engagement record associated with the identified primary database object 122, the name or identity of the protected user belonging to the requesting user's class of users or otherwise responsible for the request being prevented along with that protected user's protection expiration date and provide that information pertaining to the protected user to the virtual application 116. Thereafter, the virtual application 116 may generate a GUI display that is presented on or otherwise provided to the client device 106 that indicates, to the requesting user, which other user is currently protected and for how long that user will be protected (or when that user's protection will expire). The GUI display may include one or more GUI elements adapted to allow the requesting user to subscribe to a feed associated with the primary database object 122, and thereby automatically receive notifications of when the primary database object 122 becomes unprotected, as described above in the context of FIG. 2.

Figure 5:

FIG. 5 depicts an exemplary primary database object GUI display 500 that may be presented by a virtual application 116 within a browser application 114 on the client device 106 in accordance with one or more embodiments. For example, the user of the client device 106 may manipulate a virtual CRM application 116 to query or otherwise access the database 104 and retrieve a listing of account database objects associated with the user's tenant that are viewable to the user. The virtual application 116 may generate or otherwise provide a GUI display including the list of the tenant's accounts that are viewable to the user along with corresponding GUI elements adapted to allow the user to select a particular account for further viewing. In response to the user manipulating the GUI elements to select the 'Acme Inc.' account from the list, the virtual application 116 queries or otherwise accesses the database 104 to retrieve values for the various fields of metadata of the account database object 122 corresponding to the 'Acme Inc.' account and generates the GUI display 500 that includes or otherwise graphically represents the retrieved values for those fields of metadata.

In the illustrated embodiment, the GUI display 500 includes an engagement region 502 that is allocated for presenting information indicative of the protection status of the 'Acme Inc.' account. In this regard, to generate the engagement region 502 of the GUI display 500, the virtual application 116 queries or otherwise accesses the engagement table 126 in the database 104 to obtain the engagement record associated with the 'Acme Inc.' account, retrieve values for the fields of the engagement record identifying the currently protected (or most recently protected) users with respect to the 'Acme Inc.' account for the different classes of users along with the current protection status of those users, and generate or otherwise provide a graphical representation of the protected users and their respective protection statuses in the engagement region 502. For the illustrated embodiment, the engagement region 502 indicates John Doe as the account executive (AE) that is currently protected with respect to other AEs, Jane Doe as the enterprise business representative (EBR) that is currently protected with respect to other EBRs, and Jack Doe as the most recently protected sales representative (SR) that is no longer protected with respect to other SRs or EBRs.

Referring to FIG. 6 and with continued reference to FIG. 5, in exemplary embodiments, the GUI display 500 includes a selectable GUI element 504 (e.g., a hyperlink, a button, or the like) within the engagement region 502 that, when selected or otherwise manipulated by the user of the client device 106, causes the virtual application 116 to generate or otherwise provide a detailed engagement GUI display 600. In this regard, in response to the user manipulating the GUI element 504, the virtual application 116 queries or otherwise accesses the engagement record in the engagement table 126 associated with the 'Acme Inc.' account to retrieve values for various fields of the engagement record to populate the detailed engagement GUI display 600. For example, the illustrated detailed engagement GUI display 600 includes a protected account executive region 602, wherein the virtual application 116 queries or otherwise accesses the engagement record to obtain identification of the currently protected account executive (e.g., John Doe), the date of that account executive's most recent interaction with the 'Acme Inc.' account (e.g., John Doe's most recently initiated database activity associated with the 'Acme Inc.' account object), the amount of time (or number of days) since that account executive's most recent interaction, and the protection status of the account executive. Although not illustrated in FIG. 6, as described above, in some embodiments, the engagement record may store or otherwise maintain a protection expiration date for the account executive, wherein the virtual application 116 queries or otherwise accesses the engagement record to obtain the protection expiration date for the currently protected account executive and graphically represents the protection expiration date in the account executive region 602. In various other embodiments, the virtual application 116 may calculate or otherwise obtain the amount of time (or number of days) until the protection expiration date is reached and provide a graphical representation of the amount of time until the 'Acme Inc.' account becomes unprotected with respect to other account executives in the account executive region 602.

In a similar manner, the virtual application 116 may query or otherwise access the engagement record to obtain values for various fields used to populate the protected sales representative region 604 and the protected enterprise business representative region 606 of the detailed engagement GUI display 600. As illustrated in FIG. 6, when the protection status for the most recently protected sales representative indicates that he or she is no longer protected, the sales representative region 604 provides a graphical indication to that effect in addition to displaying the date of that most recently protected sales representative's most recent interaction with the 'Acme Inc.' account and the number of days since that interaction.

FIG. 7 depicts an example of engagement record 702 in an engagement table 700 that may be associated with the 'Acme Inc.' account depicted in FIGS. 5-6 in conjunction with the rules of engagement provided in the configuration record 302 in the configuration table 300 of FIG. 3. Referring to FIG. 7, and with reference to FIGS. 1-6, the engagement management engine 118 may create the engagement record 702 in the engagement table 126, 700 upon the account executive John Doe (who in this example is associated with the 'ORGID_1' tenant) logging in to the virtual application 116 via the client device 106 and manipulating the virtual application 116 to create an account database object 122 for the 'Acme Inc.' account (e.g., tasks 206, 208). The engagement management engine 118 identifies the appropriate configuration record 302 in the configuration table 128, 300 based on its associations with the 'ORGID_1' tenant identifier and the account object type. Upon creation, the initial protection status assigned by the engagement management engine 118 to the engagement record 702 indicates John Doe is protected with respect to other account executives associated with the 'ORGID_1' tenant for the duration indicated in the configuration record 302 (e.g., 180 days).

After creating the engagement record 702, the engagement management engine 118 regulates database activity with respect to the 'Acme Inc.' account database object 122 in accordance with the protection status indicated by the engagement record 702 (e.g., task 210), for example, by performing the regulation process 400. In this regard, if another account executive associated with the 'ORGID_1' tenant requests database activity with respect to the 'Acme Inc.' account database object 122, the engagement management engine 118 prevents the requested database activity on behalf of that unprotected account executive based on John Doe's protection status indicated in the engagement record 702 (e.g., tasks 404, 412). Conversely, if sales representative Jack Doe subsequently requests database activity with respect to the 'Acme Inc.' account database object 122, the engagement management engine 118 determines that the engagement record 702 indicates that the 'Acme Inc.' account database object 122 is unprotected with respect to sales representatives and updates the engagement record 702 to indicate that Jack Doe is now protected with respect to other sales representatives and/or enterprise business representatives associated with the 'ORGID_1' tenant (e.g., tasks 404, 408). In this regard, Jack Doe may be allowed to e-mail business contacts associated with the 'Acme Inc.' account, schedule meetings with business contacts associated with the 'Acme Inc.' account, etc., without other sales representatives associated with the 'ORGID_1' tenant being able to do so while Jack Doe is protected.

As described above, when the engagement management engine 118 updates the engagement record 702 to reflect interaction with respect to the 'Acme Inc.' account database object 122 by sales representative Jack Doe on Nov. 4, 2012, the engagement management engine 118 may access the configuration record 302 to calculate a protection expiration date 45 days after that interaction (e.g., Dec. 19, 2012) and store the protection expiration date in the engagement record 702. Thereafter, the engagement management engine 118 periodically accesses the engagement record 702 automatically in the absence of database activity to update the number of days since the last interaction by protected users along with the protection status for the various protected users (e.g., task 214). In this regard, when the engagement management engine 118 accesses the engagement record 702 after Dec. 19, 2012, the engagement management engine 118 determines that Jack Doe is no longer protected and automatically changes the protection status for Jack Doe in the engagement record 702. In response to changing the protection status in the engagement record 702, as described above, the engagement management engine 118 may automatically generate notifications that the 'Acme Inc.' account is no longer protected with respect to sales representatives and enterprise business representatives (e.g., task 216). Accordingly, an enterprise business representative associated with the 'ORGID_1' tenant (e.g., Jane Doe) that is subscribed to the 'Acme Inc.' account feed may receive the notification that the 'Acme Inc.' account is no longer protected with respect to enterprise business representatives and attempt to initiate database activity with respect to the 'Acme Inc.' account database object 122.

In response to receiving the request initiated by Jane Doe, the engagement management engine 118 determines that the 'Acme Inc.' account database object 122 is unprotected with respect to enterprise business representatives based on the engagement record 702, allows Jane Doe's request to be serviced by the database 104, and updates the engagement record 702 to indicate that Jane Doe is now protected with respect to other enterprise business representatives associated with the 'ORGID_1' tenant (e.g., tasks 404, 406, 408). In this regard, when Jack Doe neglects to maintain a desired level of engagement with respect to the 'Acme Inc.' account as dictated by the rules of engagement defined by the 'ORGID_1' tenant for its accounts, other users such as Jane Doe may be allowed to e-mail business contacts associated with the 'Acme Inc.' account, schedule meetings with business contacts associated with the 'Acme Inc.' account, etc. to maintain engagement with the 'Acme Inc.' account on behalf of the 'ORGID_1' tenant.

As illustrated in FIG. 7, as protected users (e.g., John Doe and Jane Doe) interact with the 'Acme Inc.' account, the engagement management engine 118 updates the engagement record 702 to record the date of their most recent activities such that their protection status persists when the engagement management engine 118 periodically updates the engagement record 702 provided their respective protection expiration dates have not passed.

Figure 8:
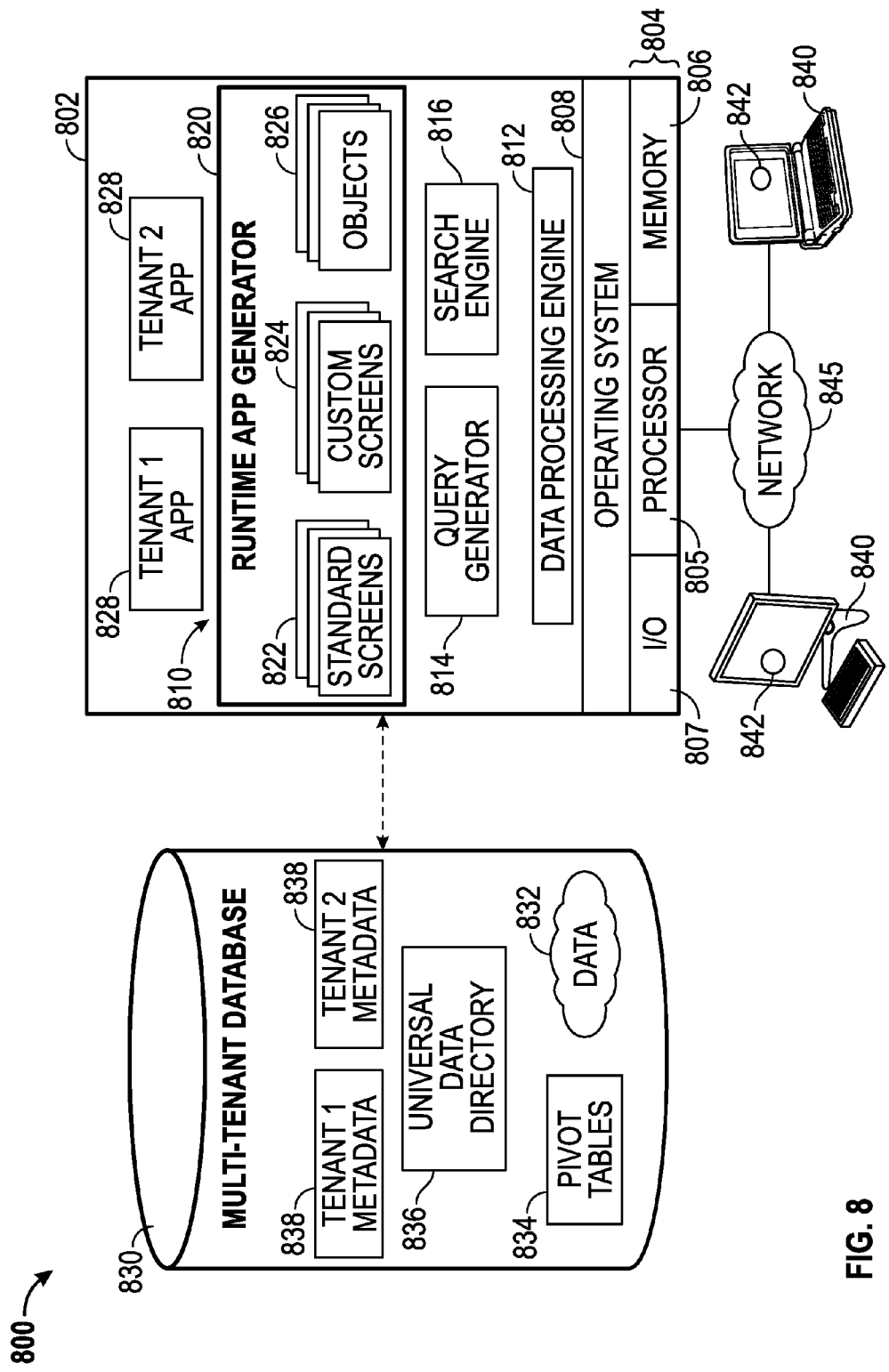
FIG. 8 is a block diagram of an exemplary multi-tenant system suitable for use as the on-demand application system of FIG. 1 in accordance with one or more embodiments.

FIG. 8 depicts an exemplary embodiment of a multi-tenant system 800 suitable for use as the on-demand application system 100 of FIG. 1. The illustrated multi-tenant system 800 of FIG. 8 includes a server 802 (e.g., application server 102) that dynamically creates and supports virtual applications 828 (e.g., virtual application 116) based upon data 832 from a common database 830 (e.g., database 104) that is shared between multiple tenants, alternatively referred to herein as a multi-tenant database. Data and services generated by the virtual applications 828 are provided via a network 845 (e.g., network 108) to any number of client devices 840 (e.g., client device 106, or the like), as desired. Each virtual application 828 is suitably generated at run-time (or on-demand) using a common application platform 810 (e.g., application platform 112) that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of regulating interaction with respect to an object in a database, the method comprising:
    creating an engagement record in the database, the engagement record being associated with the object and indicating a protection status for the object, wherein creating the engagement record comprises obtaining engagement rules for the object from a configuration record in the database and determining an initial protection status for the object based on the engagement rules; and in response receiving a request for a database activity with respect to the object from a first user:
determining whether the first user is authorized to initiate the database activity with respect to the object based on the initial protection status; and
when the first user is authorized:
updating the database to reflect the database activity associated with the object; and
updating the protection status of the engagement record in response to the database activity to indicate a protected state for the first user with respect to the object; and
after updating the protection status of the engagement record, regulating subsequent database activity with respect to the object initiated by a second user based on the updated protection status.

2. The method of claim 1, wherein:
regulating the subsequent database activity comprises preventing the subsequent database activity with respect to the object on behalf of the second user while the engagement record indicates the protected state for the first user.

3. The method of claim 1, further comprising:
providing a graphical user interface display associated with the object, the graphical user interface display including a graphical user interface element corresponding to the engagement record; and
in response to manipulation of the graphical user interface element, providing a graphical representation of the protection status in a second graphical user interface display.

4. The method of claim 1, the first user belonging to a first class of users, wherein:
updating the protection status of the engagement record comprises updating the engagement record to indicate the protected state for the first user with respect to the first class of users; and
regulating the subsequent database activity comprises preventing the subsequent database activity initiated by the second user based on the protected state when the second user belongs to the first class of users.

5. The method of claim 1, the first user belonging to a first class of users, wherein:
updating the protection status of the engagement record comprises updating the engagement record to indicate the protected state for the first user with respect to the first class of users; and
regulating the subsequent database activity comprises:
determining the second user is authorized to initiate the subsequent database activity with respect to the object based on the protection status when the second user belongs to a second class of users; and
when the second user is authorized:
updating the database to reflect the subsequent database activity; and
updating the protection status of the engagement record in response to the subsequent database activity to indicate a protected state for the second user with respect to the second class of users.

6. The method of claim 1, further comprising automatically changing the protection status for the first user with respect to the object from the protected state to an unprotected state after a protection expiration date.

7. The method of claim 6, further comprising providing a notification to the second user indicating a change to the protection status with respect to the object in response to automatically changing the protection status for the first user with respect to the object from the protected state to the unprotected state.

8. The method of claim 7, further comprising automatically generating a message indicating the change in the protection status in a feed associated with the object, wherein providing the notification comprises displaying the message to the second user when the second user accesses the feed.

9. The method of claim 7, further comprising automatically generating a message indicating the change in the protection status in a feed associated with the object, wherein providing the notification comprises pushing the message to the second user when the second user is subscribed to the feed.

10. The method of claim 6, the method further comprising:
obtaining a protection duration from a configuration record in the database; and
determining the protection expiration date based on a date associated with the database activity initiated by the first user and the protection duration.

11. The method of claim 10, wherein updating the protection status of the engagement record comprises updating the engagement record to maintain the date associated with the database activity.

12. The method of claim 10, further comprising identifying the configuration record based on an association with a tenant associated with the first user and an object type associated with the object.

13. The method of claim 1, the engagement rules providing a duration of protection for a first class of users, the first user belonging to the first class of users, the method further comprising:
determining an expiration for protection of the object for the first user based on the duration of protection, wherein updating the protection status of the engagement record comprises updating the engagement record to indicate the expiration.

14. The method of claim 13, wherein when the second user belongs to the first class of users, regulating the subsequent database activity initiated by the second user comprises preventing the subsequent database activity with respect to the object prior to the expiration.

15. The method of claim 1, wherein updating the database to reflect the database activity associated with the object comprises creating, in the database, a second object associated with the object.

16. A system comprising:
a database to store a first object, a configuration record associated with an object type associated with the first object, and an engagement record associated with the first object, the configuration record maintaining rules of engagement associated with the object type and the engagement record indicating a protection status for the first object; and
a server providing one or more instances of a virtual application to one or more client devices via a network, the server comprising a processing system and a data storage element, the server being coupled to the database to:

identify the configuration record in the database based at least in part on the object type associated with the first object;

determine the protection status for the engagement record based on the rules of engagement maintained by the configuration record;

receive a request for a database activity with respect to the first object from a first client device of the one or more client devices;

determine whether a first user associated with the first client device is authorized to initiate the database activity with respect to the first object based on the protection status;

update the database to reflect the database activity associated with the first object when the first user is authorized;

update the protection status of the engagement record in response to the database activity; and regulate subsequent database activity with respect to the first object initiated by a second user based on the updated protection status.

17. The system of claim 16, wherein:

the server is configured to update the database to reflect the database activity associated with the first object when the first user is authorized by creating a second object in the database; and the second object is associated with the first object.

18. The system of claim 16, wherein:

the database comprises a multi-tenant database configured to support a plurality of tenants;

the configuration record is associated with a first tenant of the plurality of tenants and the object type associated with the first object, the configuration record maintaining the rules of engagement associated with the object type for the first tenant;

the first user and the second user are associated with the first tenant; and the server is configured to:
  identify the configuration record in the database based on the first tenant associated with the first user and the object type associated with the first object.

19. A non-transitory computer-readable medium comprising computer-executable instructions that, when executed by a processing system, cause the processing system to:

create an engagement record in a database, the engagement record being associated with an object in the database and indicating a protection status for the object wherein creating the engagement record comprises obtaining engagement rules for the object from a configuration record in the database and determining an initial protection status for the object based on the engagement rules;

receive a request for a database activity with respect to the object from a first user;

determine the first user is authorized to initiate the database activity with respect to the object based on the initial protection status;

update the database to reflect the database activity associated with the object;

update the engagement record to indicate an updated protection status for the object in response to the database activity, the updated protection status indicating a protected state for the first user with respect to the object; and regulate subsequent database activity with respect to the object initiated by a second user based on the updated protection status.

20. A method of regulating interaction with respect to an object in a database, the method comprising:

creating an engagement record in the database, the engagement record being associated with the object and indicating a protection status for the object; and in response receiving a request for a database activity with respect to the object from a first user:
  determining whether the first user is authorized to initiate the database activity with respect to the object based on the protection status, the first user belonging to a first class of users; and
  when the first user is authorized:
    updating the database to reflect the database activity associated with the object; and
    updating the protection status of the engagement record to indicate a protected state for the first user with respect to the first class of users in response to the database activity; and after updating the protection status of the engagement record, regulating subsequent database activity with respect to the object initiated by a second user based on the updated protection status, wherein regulating the subsequent database activity comprises:
  determining the second user is authorized to initiate the subsequent database activity with respect to the object based on the protection status when the second user belongs to a second class of users; and
  when the second user is authorized:
    updating the database to reflect the subsequent database activity; and
    updating the protection status of the engagement record in response to the subsequent database activity to indicate a protected state for the second user with respect to the second class of users.

* * * * *